United States Patent [19]
Woltz et al.

[11] Patent Number: 5,995,597
[45] Date of Patent: Nov. 30, 1999

[54] E-MAIL PROCESSING SYSTEM AND METHOD

[76] Inventors: Robert Thomas Woltz, 1990 N. Alma School Rd., Chandler, Ariz. 85224; John E. Nemazi, 4373 Stoneleigh, Bloomfield Hills, Mich. 48302

[21] Appl. No.: 08/785,308

[22] Filed: Jan. 21, 1997

[51] Int. Cl.[6] .................................................. H04M 11/00
[52] U.S. Cl. ..................................... 379/93.24; 379/88.15
[58] Field of Search ............................ 379/93.24, 88.15; 395/200.62, 200.33; 455/412; D14/191

[56] References Cited

U.S. PATENT DOCUMENTS

| | | | |
|---|---|---|---|
| 5,604,788 | 2/1997 | Tett | 455/412 |
| 5,758,088 | 5/1998 | Bezaire et al. | 395/200.62 |
| 5,764,899 | 6/1998 | Eggleston et al. | 395/200.33 |

*Primary Examiner*—Zarni Maung
*Assistant Examiner*—David M. Ovedovitz
*Attorney, Agent, or Firm*—Brooks & Kushman P.C.

[57] ABSTRACT

The method is implemented using a mail program running on a host computer which receives incoming electronic messages. An authorized user queries a user data profile and generates a series of e-mail messages and pager messages which are formatted and distributed based upon the user profile and data filtered from the incoming message. The method allows an e-mail recipient to be promptly notified via pager of the receipt of any mail message and, depending upon the message typed, receives a complete copy of the message, a simple message notice or can have the message delayed until expiration of a message hold period. An embodiment of the invention is particularly adapted for use with two-way pagers enabling the message to be copied and sent to recipient's e-mail box while containing the full two-way pager functionality with enhanced resend and no response replay capability.

17 Claims, 8 Drawing Sheets

E-MAIL PROCESSING SYSTEM AND METHOD

TECHNICAL FIELD

The present invention relates to e-mail processing systems capable of forwarding messages to both a user's pager and e-mail box.

BACKGROUND ART

The use of e-mail transmitted over the Internet or through a local area network (LAN) is becoming ever increasingly popular. If a user's workplace is provided with a LAN-based e-mail system, it is possible to promptly notify a user sitting at his or her workstation of a new e-mail message. In many instances, however, a user may be away from the workstation and will not be promptly notified of an e-mail message. Similarly, when a user is home and not on-line, the user is not promptly provided with e-mail messages which frustrates the entire purpose of e-mail. In order for e-mail to become an effective communication tool, it is necessary to promptly notify a user upon the receipt of an e-mail message in his or her e-mail box, which typically requires a phone call, defeating the purpose of e-mail.

In order to address the e-mail notice problem, several Internet service providers (ISP) offer a service in which a customer who has a pager is automatically sent a page indicating "you have mail" upon the receipt of an e-mail message in the user's e-mail box. The message format is frequently limited, and few ISP's at the present time provide such a service.

Several pager companies, namely, Paging Network and M-Tel have introduced e-mail access for users having Motorola alphanumeric pagers. Rather than using proprietary software and a direct-dial modem for transmitting an alphanumeric message to the pager company, anyone having Internet access can simply create a short message and forward it to a unique address associated with the pager owner's name at the paging company Internet address, i.e. XXX@pageco.com. The problem associated with this service is that long messages exceeding the page length limit will be truncated. Furthermore, pages cannot include attachments, preventing someone from simply sending a message to both the pager and an e-mail box using the "to" and a "cc" line to address the recipient's e-mail box and pager simultaneously.

In short, there is a well recognized need for seamlessly integrating pagers and e-mail in order to promptly notify a user of an e-mail message which the pager and the Internet service provider industries are attempting to address. However, the present system has serious defects which limit the successful implementation of e-mail paging.

SUMMARY OF THE INVENTION

For the foregoing reasons, a need exists for an e-mail processing method and system which is capable of integrating paging and conventional e-mail box services.

It is an object of the present invention to enable a user to coordinate multiple e-mail boxes, whether they have conventional e-mail boxes in a LAN or through an ISP, or a pager with e-mail, to appropriately distribute messages when received at a single user e-mail address.

It is a further object of the present invention to enable the user to appropriately select what type of information will be forwarded to the pager, and the type of notice transmitted, in order to prevent excessive pager usage.

In carrying out the above objects, the present invention provides an e-mail processing method utilizing a mail program resident on a host computer which is linked to a network, such as the Internet or an intranet. The program cooperates with a user database containing user profile data for each authorized user. When e-mail is sent to the host computer addressed to an authorized user, the message is received in the typical format having fields for: to address, from address, subject, and text body. When the "to address" is verified as an authorized user, it is associated with a user name and the user profile data. The mail program then creates and forwards a copy of the incoming message to the various e-mail addresses specified in the user's profile data. The mail program further retrieves the user's pager e-mail address and pager type from the profile data. A pager message is then created in suitable format for each specified pager. Numeric pagers are appropriately sent a numeric message and alphanumeric pagers are sent alphanumeric messages which do not exceed the page length limit, typically set by the pager company or specified by the user. In a preferred embodiment of the invention, pager messages exceeding the page length limit are broken up into multiple messages and sequentially transmitted.

Preferably, the method filters the incoming messages searching at least one of the header fields, such as "from address," or "subject" and also the body of the message to determine whether a match occurs with a stored value. If a match occurs, the method modifies the pager message in response to the stored value, while leaving the forwarded e-mail message substantially unchanged. Additionally, the preferred system enables the user to set user definable hold blackout periods or times so messages will not be sent to the user during certain times of the day, days of the week, when on vacation, etc. The program is provided with a hold bypass so that an urgent message can be sent to the user's pager during a blackout or hold period.

In further carrying out the objects of the present invention, when used with a two-way pager, the mail program will send a pager message to the two-way pager which has a unique "from" name including a message number and identifying the host computer, i.e. "from: XXX@host.com," which is logged in the host computer along with the associated original "from address" which identifies the sender of the incoming message. The pager message has the body modified to include the original sender's address. The pager message, when received by the pager company, is forwarded to the user's pager. A reply from the two-way pager received by the pager company is sent back via e-mail to the host computer, i.e. XXX@host.com. The mail program filters incoming e-mail messages to determine if the message with the "from" address matches a logged unique name with the message number whereupon the incoming message is reformatted into an e-mail message to the original sender based on the sender's address which is associated with the logged unique name.

These and other features, aspects and embodiments of the present invention will become better understood with regard to the following description, appended claims and accompanying drawings.

BEST MODES FOR CARRYING OUT THE INVENTION

Figure 1:
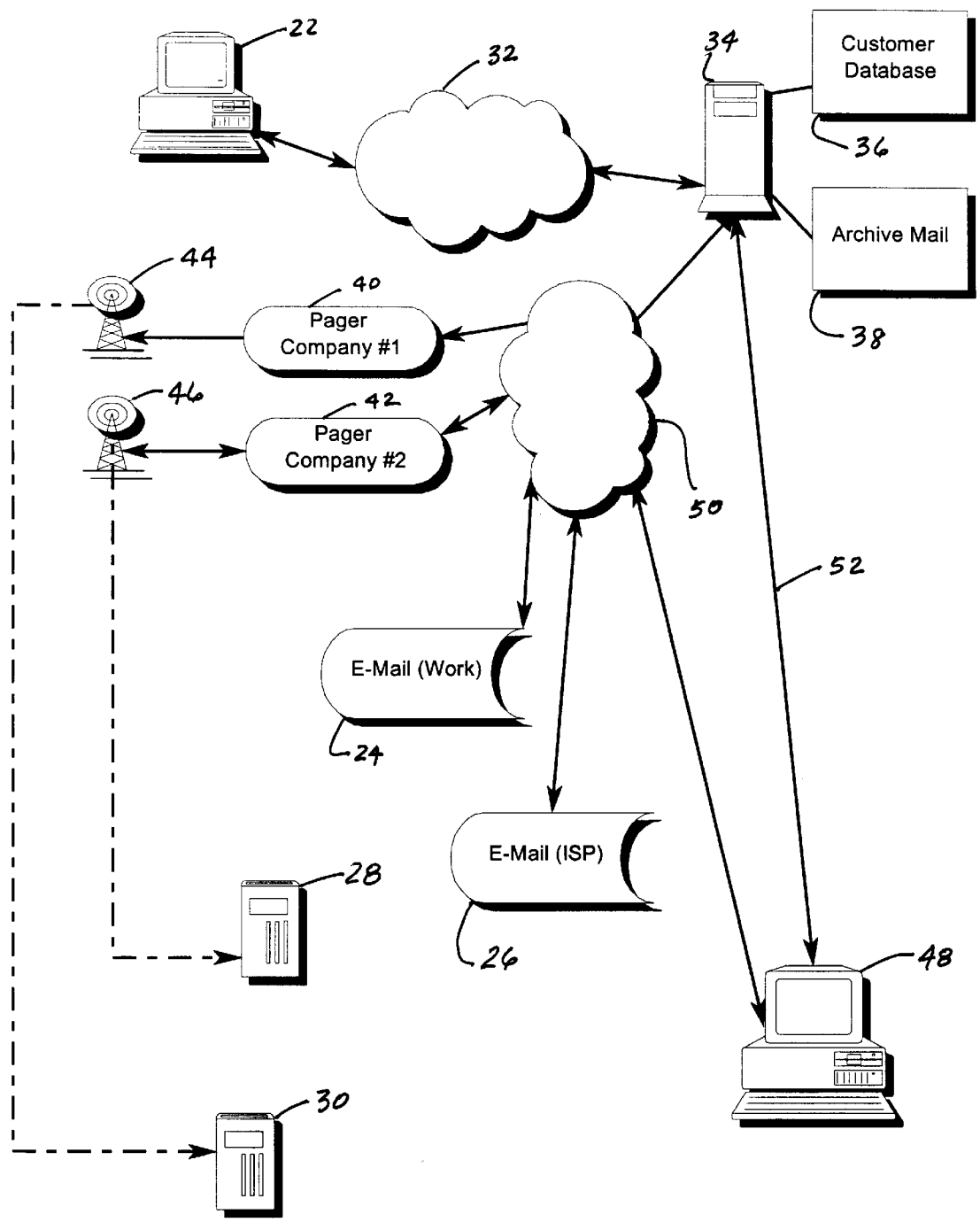
FIG. 1 is a flow chart illustrating the overall system and the interrelationship of the various hardware components.

FIG. 1 schematically illustrates an e-mail system 20 which enables a sender having a computer terminal 22 to simultaneously transmit an e-mail message to a user having one or more e-mail boxes 24 and 26 and one or more pagers 28 and 30. The sender transmits an e-mail message via a network represented by cloud 32, to host computer 34. In a preferred embodiment, the network is connected at least periodically to the Internet. Host computer 34 will typically be a domain name server and the incoming Internet message would be addressed to the particular user at the domain name, i.e. user@host.com.

The host computer 34 is provided with a mail program resident on the host computer or an associated mail server, which cooperates with a customer or user database 36 and a storage device for archiving messages 38. When an incoming e-mail message is received for an authorized user, the host computer associates the "to" address in the header with a user name and user profile data contained in the customer database 36. Utilizing the profile data, the program generates a copy of the e-mail message which is sent as an outbound e-mail message to each of the designated e-mail boxes 24 and 26.

The program further creates pager messages in e-mail format suitable for each of the specified pager types identified in the user profile data and sends those messages to the specified e-mail address for the user at the various designated pager companies 40 and 42. The pager companies then create and transmit pager messages which are RF broadcast utilizing a network of RF antennas 44 and 46.

Pagers can be any one of a number of conventional types, such as numeric pagers, numeric-plus pagers, alphanumeric pagers, or two-way pagers. The mail program on the host computer will appropriately configure a message for each pager which complies with the various formats of the pager companies identified in the user database. The user is preferably capable of directly addressing and modifying a number of the user profile database fields present on the host computer by using a computer terminal 48 to access host computer 34 via Internet link 50 or a direct modem dial-up connection 52.

The operation of the mail program resident on the host computer 34 is illustrated with reference to FIGS. 1–9. The incoming message from the Internet 32 is received by the mainframe server 54. The e-mail name, i.e. the portion of the name preceding the @ symbol is checked to determine if it is that of an authorized user by comparing the e-mail name to authorized user names. If the e-mail message is addressed to an authorized user, the message is transferred from the domain name server routine 54 to the name server routine 56, which translates the e-mail name to an appropriate system name utilized by the computer program.

Next, extraneous header information is deleted from the message at box 58 so that the message is transmitted to the user free of extraneous header and routing information. The messages with the header data removed are then processed in the main body 60 of the mail program. Multiple messages are created and various subroutines are run so that the messages transmitted to the user's e-mail boxes and pagers comply with the profile information in the user's profile data. The various subroutines executed in the main program are described subsequently with reference to FIGS. 5–9.

The output of the main program 60 is then transmitted to a series of subroutines which generate different e-mail message formats. Subroutine 62 generates e-mail messages for transmission to conventional Internet e-mail boxes. Subroutine 64 generates messages in Pagenet alphanumeric text format. A series of other subroutines, collectively represented by subroutine 66, write other e-mail messages in formats for other pager types which are used with the e-mail processing system 20. All of the messages once formed are then filtered through a filtering routine 68 described subsequently with reference to FIG. 9. The messages, once filtered and/or modified in the filter routine 68, are transmitted to a pager routine 70, shown in more detail in FIG. 3.

The pager routine 70 separates out all of the pager messages, sorting them by pager type. In box 72, numeric pager messages are extracted. The program looks up the e-mail pager address and pager company name, box 74, in the customer profile database, and the message is written and sent to the user's pager at 76. The message transmitted to the numeric pager would be a simple code, i.e., 1111, forwarded to the pager to inform the user that an e-mail message is in the user's e-mail message box.

Optionally, the routine continues to check the customer profile database to determine if the customer has indicated that he or she is on vacation at decision block 78. If a vacation message is activated, a reply will be sent to the sender of the message transmitting a user definable "on vacation" message at block 80. If the user is not on vacation, the system is capable of sending a standard reply, i.e. "a message has been transmitted to my pager and e-mail box" at block 82 if the user has enabled this feature.

In a manner similar to the numeric pager message extraction step, alphanumeric pager messages are extracted in decision block 84. The mail routine looks up a phone number and pager company in step 86 and writes and sends a message in the appropriate format at block 88. Subsequent to sending the message in block 88, the vacation subroutine represented by decision blocks 78, 80 and 82 are operated in the manner previously described with reference to the numeric pager message processing steps.

The pager routine further extracts numeric-plus pager messages in decision block 90. Numeric-plus pagers are different from numeric pagers in that they are capable of sending a user definable numeric number string transmitted via the Internet to the pager company. In the case of a numeric-plus pager, the message, once extracted at block 90, is then associated with a pager number and a pager company at block 92. If that message contains a phone number in the subject line which complies with a certain prescribed format criteria, the phone number is transmitted and displayed on the numeric pager, as indicated in block 96. If decision block 94 determines that no appropriate phone number has been entered on the subject line, a default message is sent represented by decision block 98 which simply provides the pager owner with an indication that e-mail is in his or her e-mail box. Again, as in the case with the alphanumeric pager and numeric pagers, the "on vacation" routine represented by decision blocks 78–82 is preferably initiated. The e-mail program is capable of detecting multiple identical messages, therefore, in the event a user has both a numeric pager and an alphanumeric pager, only a single vacation reply would be transmitted.

The two-way pager messages are extracted at block 100. If the user is on vacation, as determined by querying the user profile in block 102, a vacation reply is sent in block 104. If the user is not on vacation, a unique log name which is supplied in the "from address" for the outbound message is logged in a queue along with the original "from address" in block 106 whereupon the message is sent to the pager company in block 108. After a predetermined time delay 110, such as a half hour or the like, all logged messages are resent at block 112. The messages are resent for a prescribed time out period before being deleted or until the two-way pager user responds whereupon the logged message is deleted as described subsequently. When a time out occurs at block 111, a reply is sent to the sender at block 113, indicating no response was received from two-way pager. After several attempts, transmission is terminated.

A reply message from a two-way pager will not match any of the authorized user names present in the database as determined by block 54. As such, block 101 determines whether the message is a reply from a two-way pager. The "two" fields in the header for a reply message will contain a logged message number and identify the host computer. As indicated by block 103, if the header of the incoming reply message contains a message number which has previously been logged, the logged entry is deleted and block 107 sends an appropriate reply to the sender at the address which was stored with the message number. The reply may be based on the information contained in the profile data for the authorized user. If the incoming message is not addressed to an authorized user as indicated by block 54, and does not match any of the logged message numbers as determined by block 101, the message is discarded as indicated by block 105.

It should be appreciated that pager routine 70 will be modified accordingly as pager companies develop various new pagers having different performance characteristics.

Figure 4:
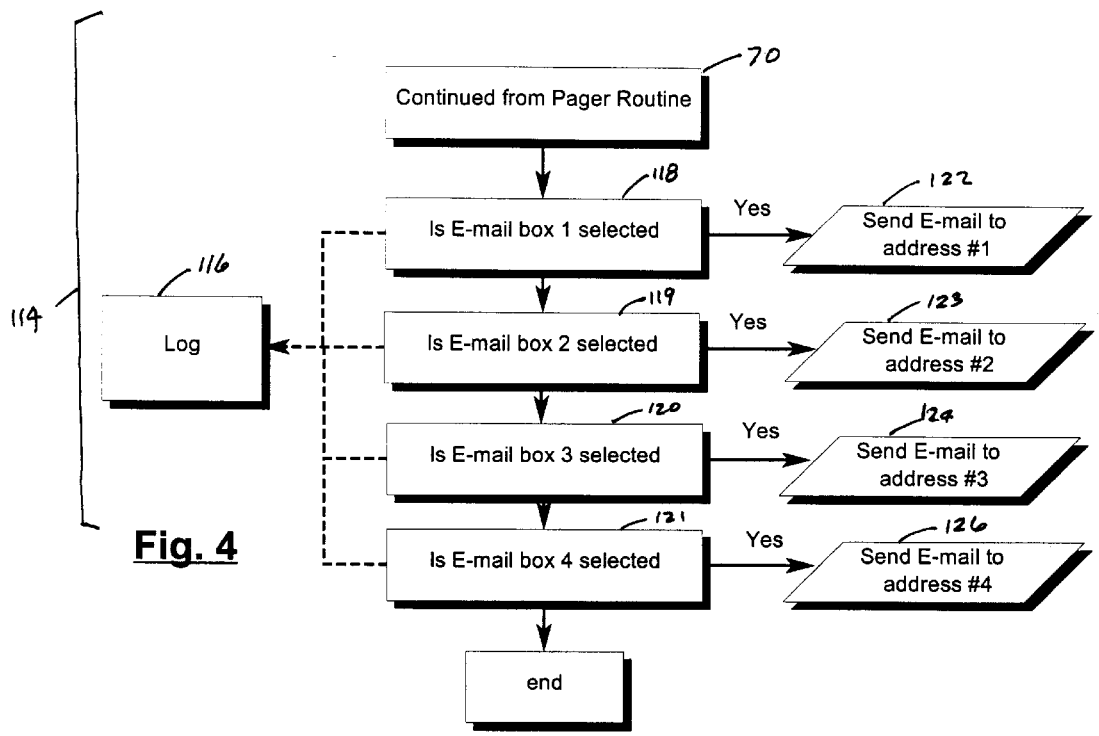
FIG. 4 is a continuation of the mail program from FIG. 3.

Atfer the completion of the pager routine 70, the remaining messages are forwarded to the e-mail routine represented by box 114 and described in further detail in FIG. 4. The e-mail routine checks the user profile data log 116 in a series of decision blocks 118, 119, 120, and 121 to determine whether or not the user has one or more e-mail addresses specified. One should appreciate that any number of e-mail messages can be copied and distributed, however, four should be adequate for the vast majority of system users. If an e-mail address is detected in each of the four e-mail box fields in the data profile, appropriate e-mail messages are generated addressed to the designated address as shown by send e-mail output boxes 122, 123, 124, and 125.

Figure 5:
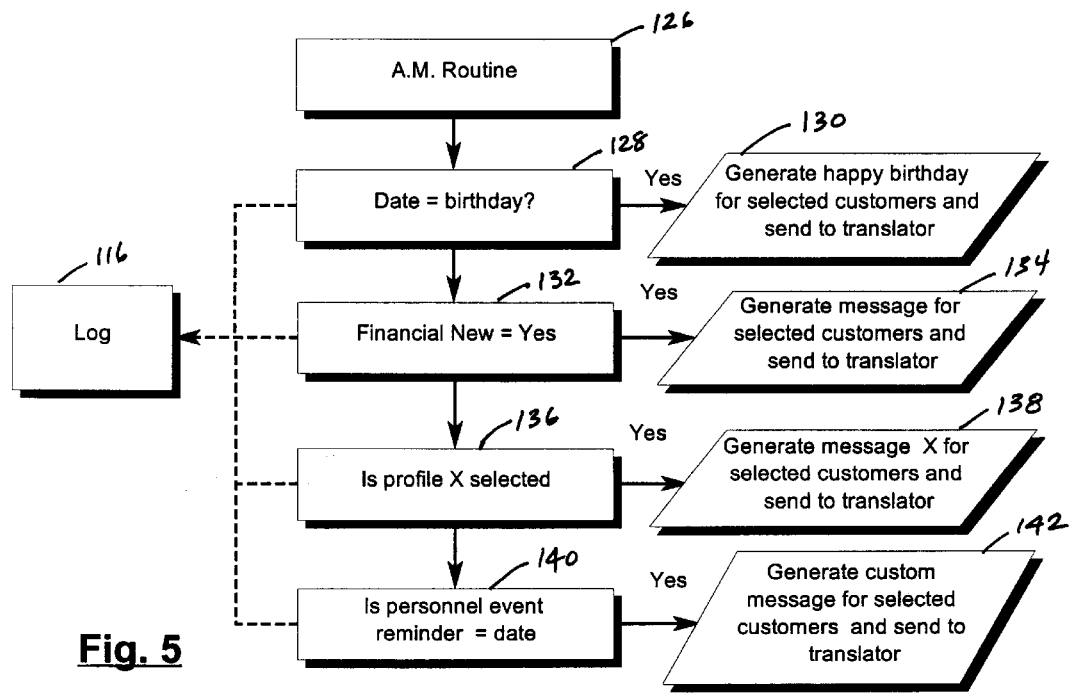
FIG. 5 is a flow chart illustrating an A.M. message generation routine.

In addition to simply forwarding e-mail messages, the e-mail program is capable of generating and distributing mail. FIG. 5 illustrates a morning routine which is run each day in the mail program. At the selected time, the A.M. routine 126 is initiated. The program checks the user profile log at step 128 and identifies users having a birthdate data entry equal to the current date, whereupon a "Happy Birthday" message is generated and transmitted in step 130. The data profile of users will then be further queried to determine which users subscribe to Financial News in decision block 132. Depending on the user profile, an abbreviated Financial News message, a simple Financial News notice, or no notice at all may be transmitted to the pager while the complete Financial News letter information is forwarded to the user's e-mail box in step 134. Similarly to that described for the Financial News decision and message generation blocks 132 and 134, any profile built into the customer profile table can be searched in decision block 136 and an appropriate message for that specific profile, i.e. sports scores or world news can be appropriately transmitted to the user in the selected format in block 138.

The A.M. routine 126 is further capable of querying customer data profiles for a personal event reminder entry 140 and, in turn, generating a custom message at block 142 which is sent to the message translator. For example, an anniversary or a birthday reminder message may be sent. A similarly functioning scheduled routine is run at noon and at 5:00 p.m., or other scheduled times for generating additional messages if the message for one of the selected profiles is changed.

Figure 2:
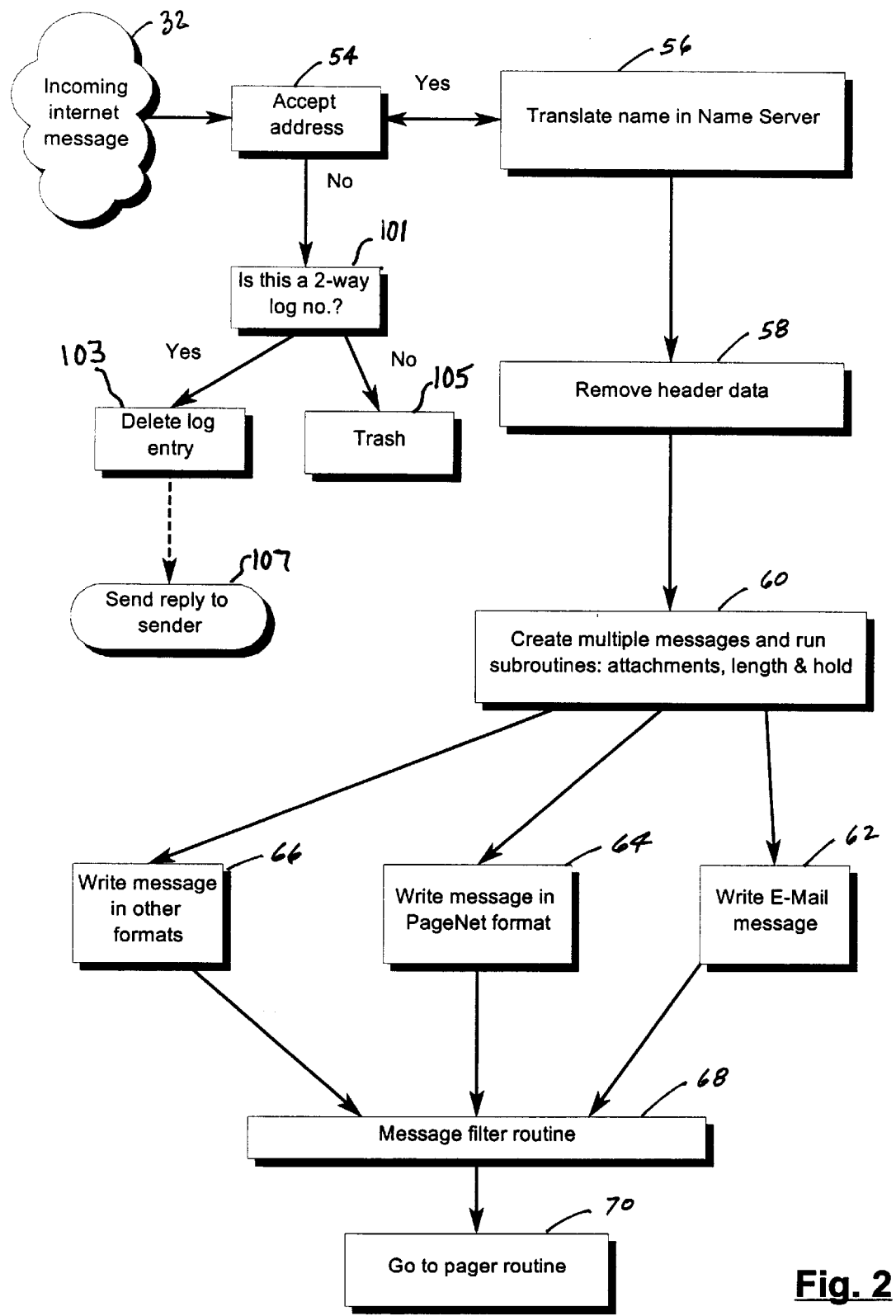
FIG. 2 is a flow chart of a portion of the mail program.
Figure 3:
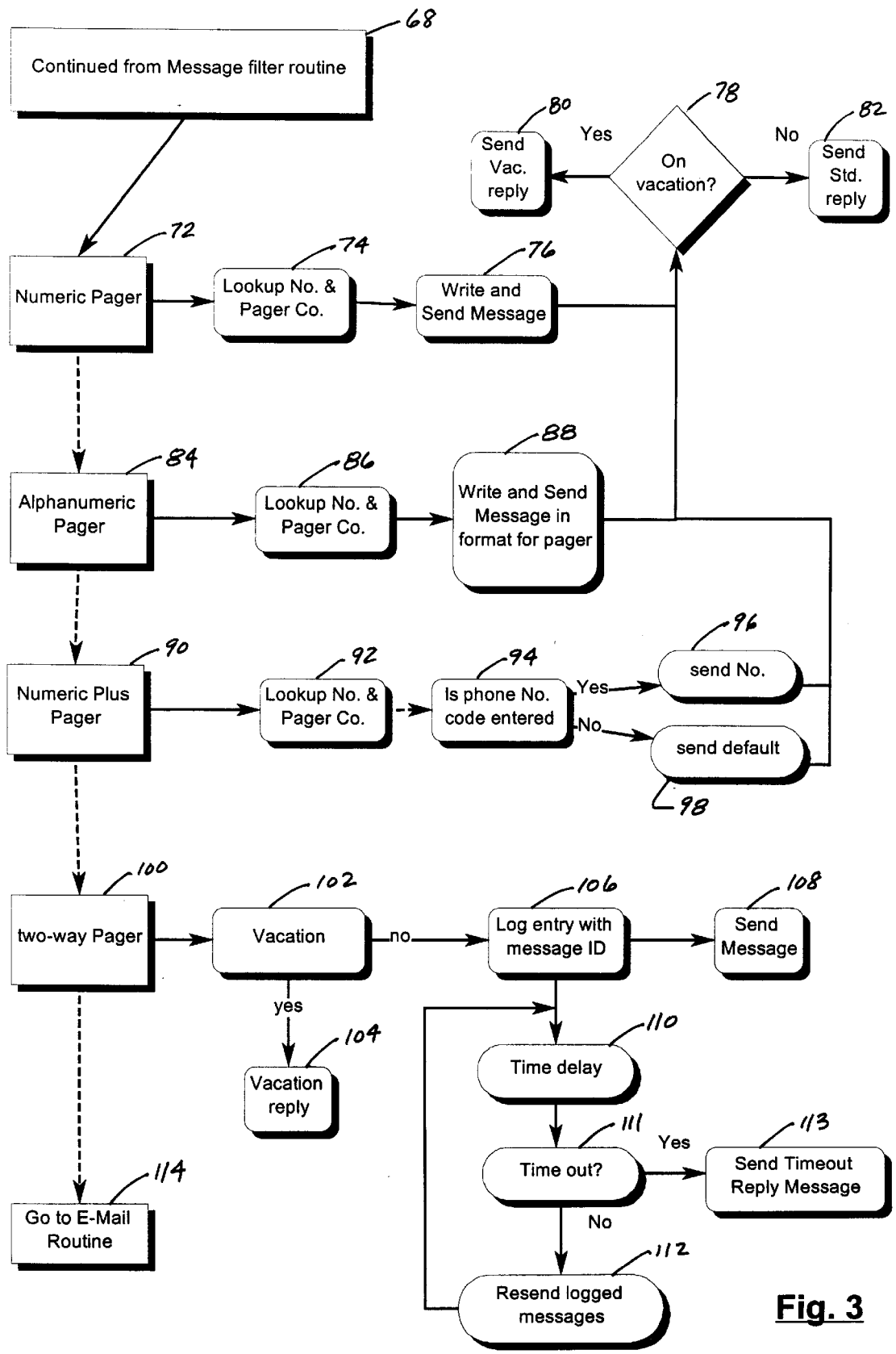
FIG. 3 is a continuation of the mail program of FIG. 2.
Figure 6:
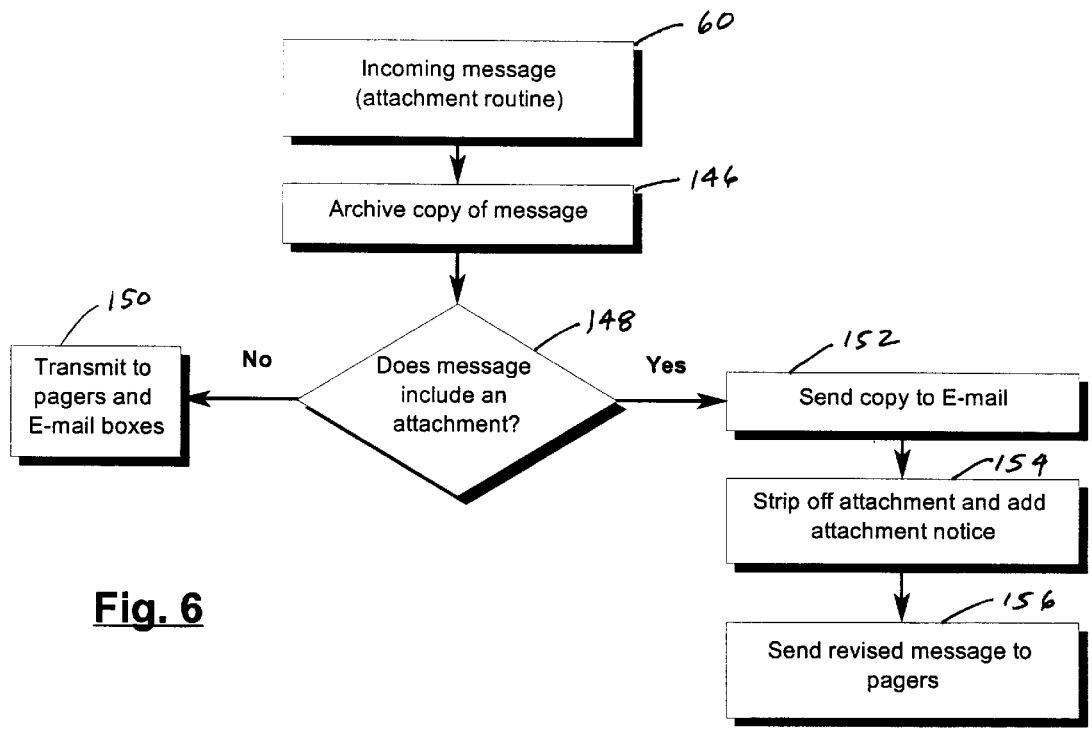
FIG. 6 is a flow chart illustrating the attachment removal subroutine.

FIG. 6 illustrates an attachment subroutine which is implemented in the main program body 60 referenced in FIG. 2. An incoming message generated within main program body 60 enters the attachment routine whereupon a copy of the message is archived at step 146. Once archived, decision block 148 determines whether or not the message includes an attachment. If not, the message is transmitted to the pager and e-mail routines at box 50, as described previously. If an attachment is present, the "complete copy" of the message including the attachment is sent to the user's e-mail at box 152. The message then has the attachment stripped off and an appropriate notice is added to the message, indicating that an attachment is in the user's e-mail box at step 154. Subsequently, at step 156, the revised pager message continues through the program.

The attachment routine prevents e-mail messages containing attachments from being forwarded to the user's pager which would otherwise cause problems within the paging company host computer. Furthermore, the recipient of the pager message would be uninformed that an attachment had been removed. In the preferred embodiment of the invention, the archived copy of the message 146 would be available on the host computer for a limited period of time in the event that the e-mail message is received in the user's e-mail box in corrupted form.

Figure 7:
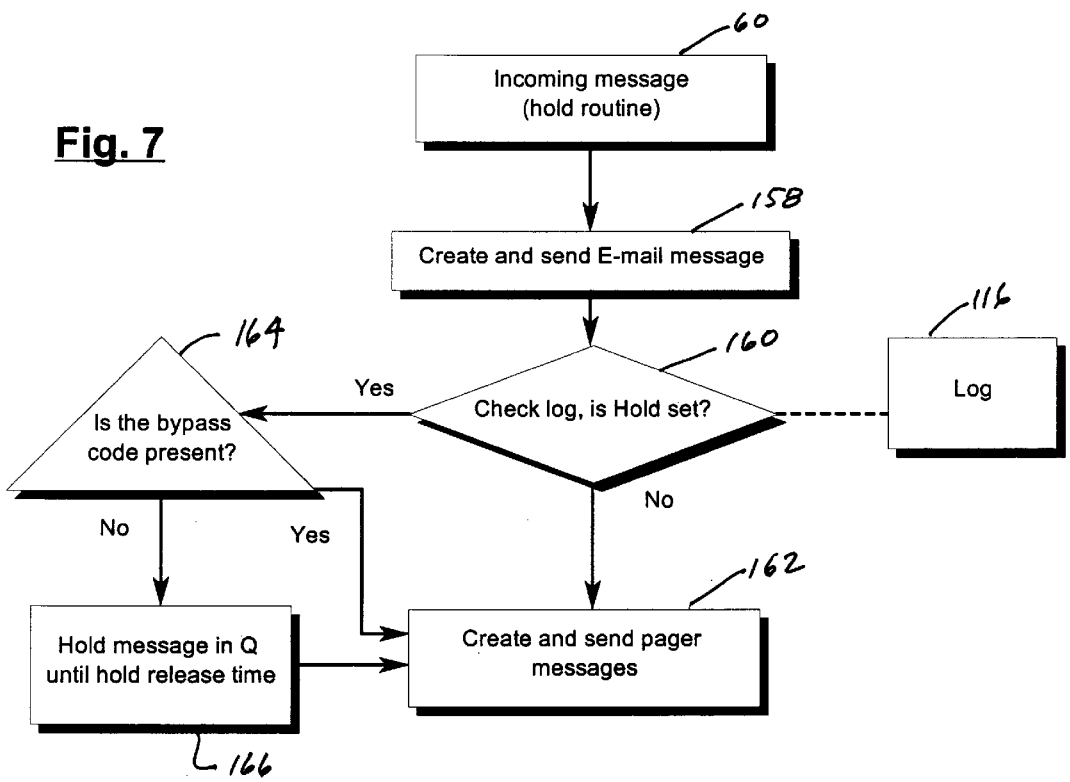
FIG. 7 is a flow chart illustrating the hold and hold bypass subroutine.

FIG. 7 illustrates an incoming message hold routine. The hold routine is implemented in the main program body 60 after the e-mail box messages are created and transmitted in box 158 and as generally described previously. The hold routine checks the user profile data to see if the user has requested that messages be held during a predetermined blackout period. If decision block 160 indicates that the hold is not set, messages are sent to the pager as indicated by box 162 in a conventional manner described previously. If hold is set, the message would be typically held in queue until the hold time expires. In the preferred embodiment, however, decision block 164 analyzes the message to determine whether or not a bypass code is present. A bypass code can be in a number of forms such as a predetermined "from" address, a predetermined subject line, or a unique code placed in the first line of the text body. If a bypass code is present, the message is created and sent to the pager regardless of a hold being requested. If the bypass code is not present, the message is held in queue as indicated in block 166 and held until the appropriate message release time whereupon the message is forwarded to the user. This hold and hold bypass feature is very helpful in preventing the user from being bothered by pagers going off in the middle of the night when a friend who cannot sleep is sending out e-mail. Similarly, the hold bypass feature allows important messages through, regardless of time of day.

Figure 8:
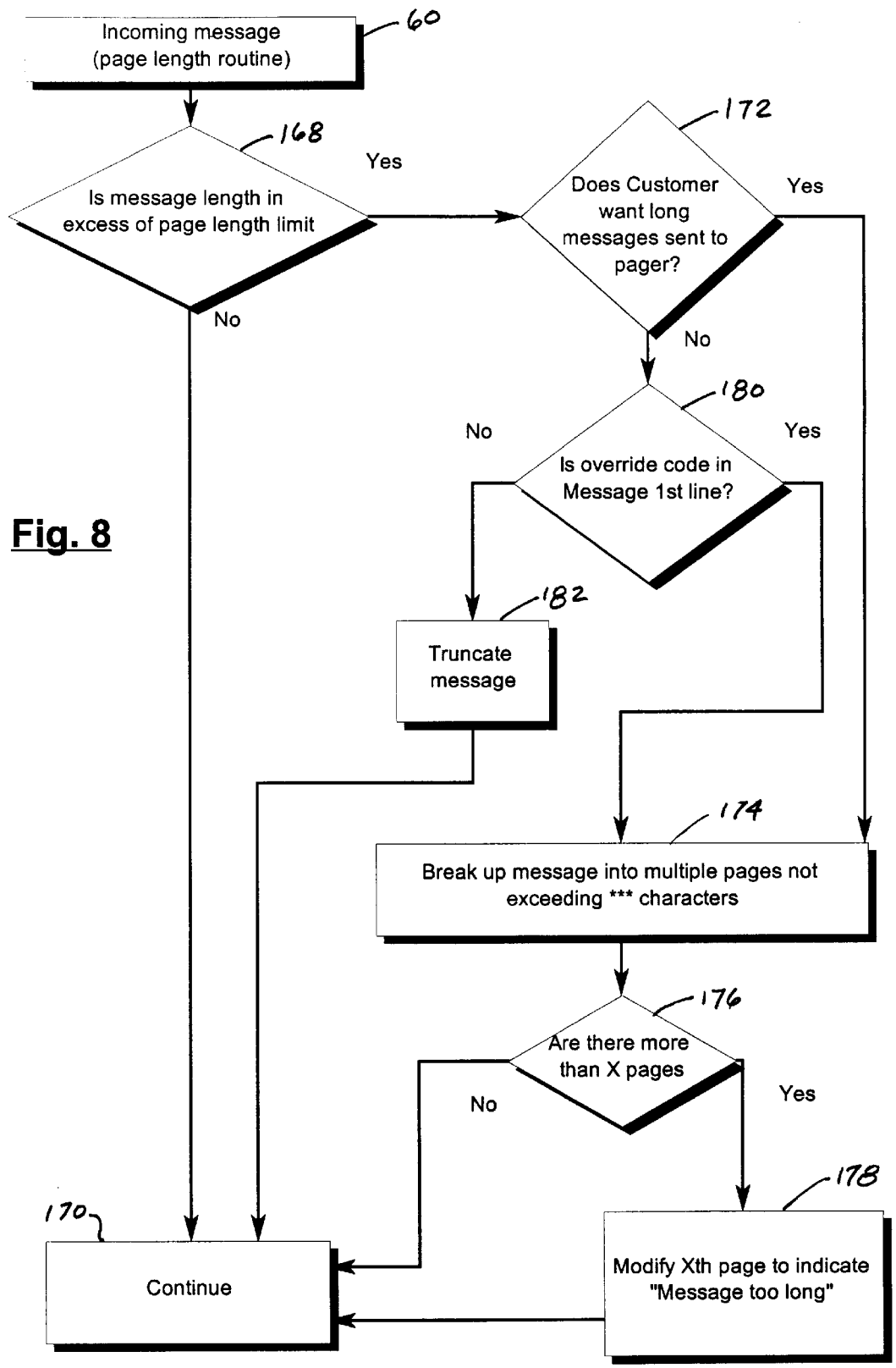
FIG. 8 is a flow chart illustrating the page length limit routine.

FIG. 8 illustrates a page length routine which is implemented within the program main body 60. Decision block 168 checks the message length to determine whether the message length falls within a page length limit. If not, the program simply continues, passing the message to block 170. If the message exceeds the page length limit, the customer profile data is checked to determine whether or not the customer wants to receive long messages. If so, the message is then sent from decision block 172 to block 174 where the message is broken up into multiple pages not exceeding the page length limit. A test is then performed in decision block 176 to determine the total number of pages. If there are fewer than a predetermined page limit, the messages are transmitted at block 170.

If there are excess pages, i.e., more than X pages, the last permissible page X is modified to indicate "message too long" and the excess pages are deleted in block 178 before the messages 1 through X are transmitted to the continue block 170. If the customer indicates in the user profile that long messages are not wanted, in decision block 172, the message is checked in decision block 180 to determine whether or not a predetermined override code is present in the first line in the text body. Alternatively, the override code can be placed in the subject line or based on the sender address. In any event, if the override code is present, the message will be broken up into multiple pages and sent. If the message override code is not present, the message is truncated in block 182 and the truncated single page message is forwarded to the pager.

Figure 9:
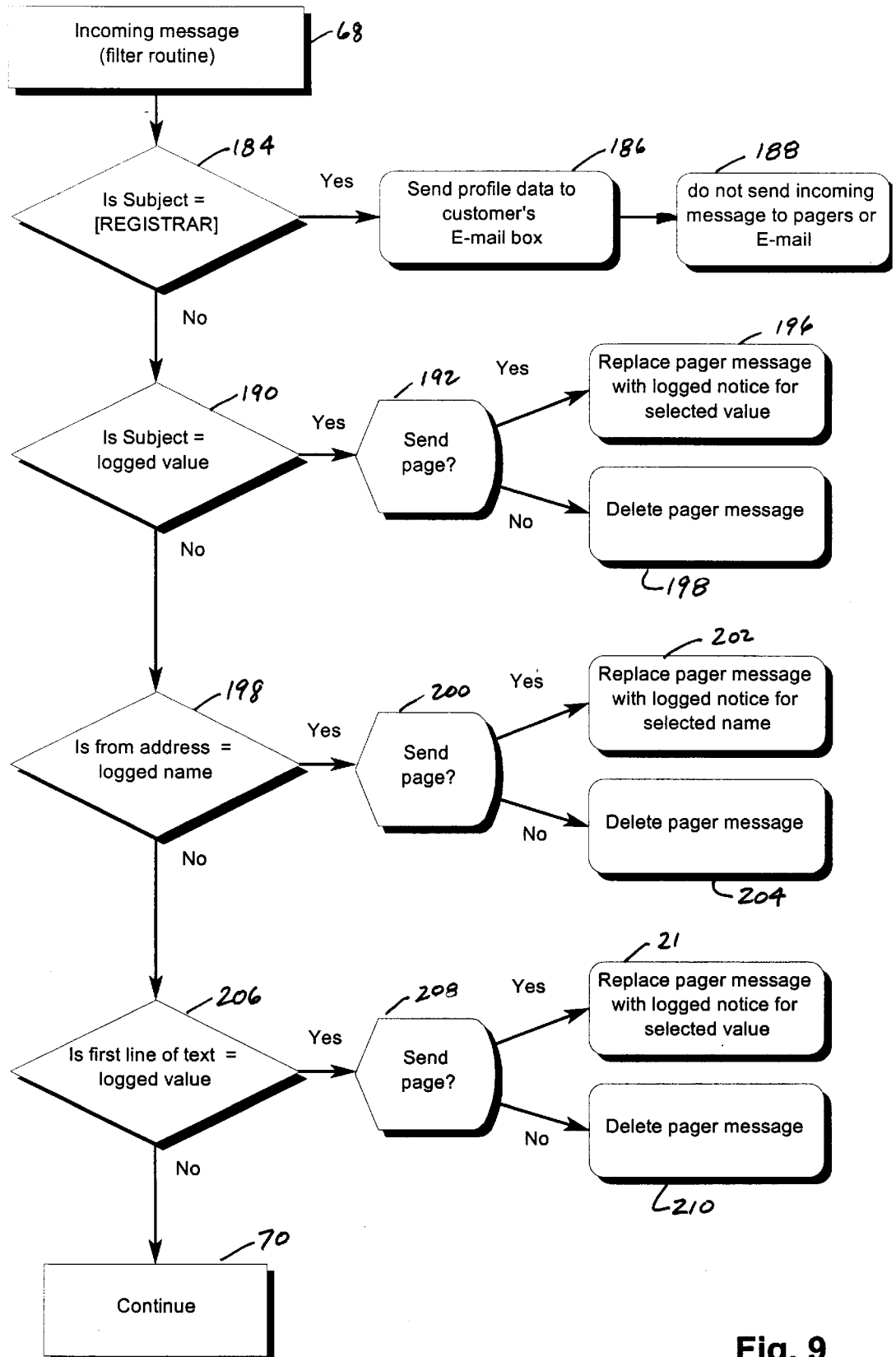
FIG. 9 is a flow chart illustrating the incoming message filter routine.

The message filter routine illustrated and described with reference to FIG. 2 is described in more detail in FIG. 9. Whether the message filter routine is run subsequent to creating the series of messages in blocks 62, 64 and 66 or is part of the main program body 60 is a matter of programming choice in the present embodiment. The message filter routine is located where indicated in FIG. 2. The incoming message is subjected to a series of tests. In decision block 184, the subject line is inspected. If the subject is set equal to [register], the program generates a message listing the customer's data contained in the profile data. This message is written as an e-mail message addressed to the customer's primary e-mail box. The incoming message is deleted at step 188 and is not sent to the customer's pager or e-mail box. The register routine enables a customer to download a complete customer profile in order to determine whether or not changes are appropriate.

The filter routine further queries the subject field to determine whether or not the field is set equal to a log value. If the log value is present, a page will be sent or not, dependent upon a user selected profile criteria. The subject text in decision block 190 will query the user profile and determine whether a page be sent or not in step 192. The logged value perferably indicates whether the pager message should be deleted in its entirety in block 194 or replaced with an abbreviated notice-type message in block 196, i.e., you have financial news in your e-mail box.

The filter routine similarly can query the message "from" address in decision block 198 to determine whether the "from" address is equal to a predetermined logged name. The user profile will provide information to decision block 200 as to whether the message from the logged name should be replaced with a logged notice at box 202, such as "company news letter in mail box" or the pager message can be deleted in its entirety at box 204.

Additionally, the filter routine 68 can inspect the text body, particularly the first line of the text body, as in decision block 206, to determine whether the first line of text matches a logged value. If so, the user profile information will be processed in decision block 208 to determine whether or not the message should be deleted as in 210 or modified in block 212 in the manner previously described. Messages passing through the filter routine 68 continue to the pager routine 70 as described previously.

Figure 10:
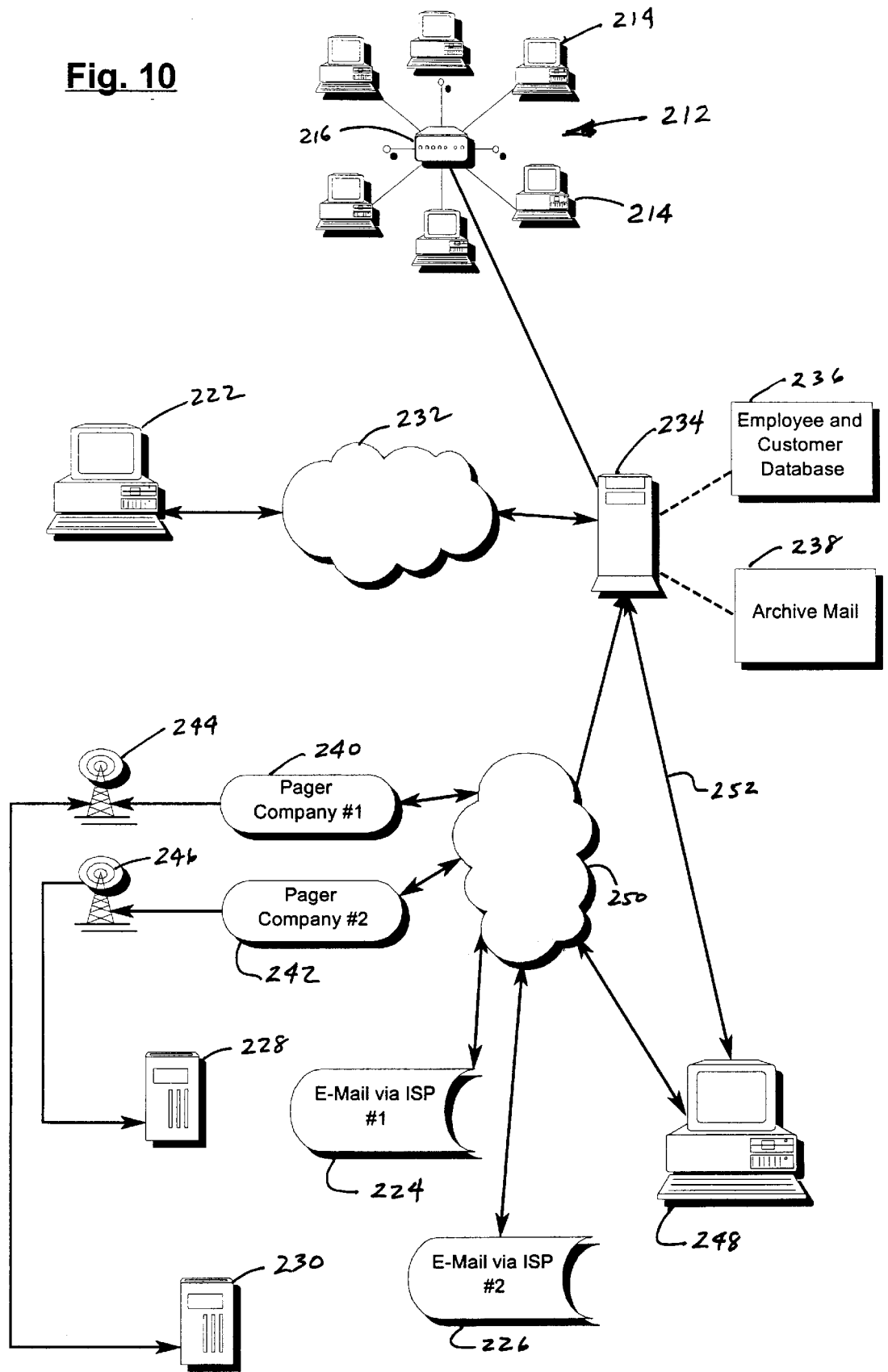
FIG. 10 is a schematic system diagram of an alternative embodiment of the invention deployed on a host computer connected to a LAN.

FIG. 10 illustrates an alternative paging system 220. E-mail paging system 220 is very similar to e-mail paging system 20 described previously and like components are given similar numbers incremented from 200. In e-mail paging system 220, host computer 234 is not part of a commercial mail processing service, but is rather part of a local area network 212 having a plurality of workstations 214 connected to one another and to host computer 234 by hub 216. The system can function substantially identical to the e-mail processing system 20, however, incoming e-mail messages may originate from the LAN 212 as opposed to a remote site connected to the host computer via an Internet connection.

In practicing the present invention, one can utilize a wide variety of hardware configurations, operating systems, and software. The invention is not limited to any specific hardware/software combination. It is believed that one skilled in the programming art can write from scratch or modify existing mail programs in order to practice the present invention. Applicants developed the previously described system using a conventional Intel Pentium-based personal computer as a host computer, running a Microsoft Windows NT operating system. The mail program, which is run on the host computer, was developed by modifying a commercial mail processing/BBS program entitled "WildCat 5" sold by Mustang Software, Inc. of Bakersfield, California, entitled "WildCat 5 for Windows 95 & Windows NT, System Operator's Guide" printed Feb. 20, 1996, ©1986, 1996, incorporated by reference herein for background purposes. Database 36 is a Microsoft Access for Windows 95 version 7.0 database which preferably stores data on a RAID hard drive 38.

While the best mode for carrying out the invention has been described in detail, those familiar with the art to which this invention relates will recognize various alternative designs and embodiments for practicing the invention as defined by the following claims.

What is claimed is:

1. A method for providing electronic message processing using a host computer linkable to a network, the host computer cooperating with a user database containing profile data for each of a plurality of authorized users, the method comprising:

receiving an incoming electronic message addressed to an authorized user from a sender with access to the network, the incoming message having a header including a sender's address and a body;

associating information in the header with corresponding profile data for the authorized user;

retrieving at least one pager type and corresponding pager electronic mailing address from the profile data;

for each two-way pager specified in the profile data:
creating a pager message having a header which identifies the host computer and a message number corresponding to the incoming message, the pager message having a body which includes an identification of the sender;

storing the message number and the sender's address;

periodically sending the pager message to the pager electronic mailing address until a reply containing the message number is received from the pager electronic mailing address; and sending an electronic mail message to the sender based upon receiving the reply.

2. The method of claim 1 wherein the step of periodically sending the pager message is terminated after a predetermined timeout period.

3. The method of claim 1 wherein the step of sending an electronic mail message to the sender includes sending an electronic mail message having a header which identifies the authorized user.

4. The method of claim 1 further comprising forwarding a copy of the incoming message to at least one electronic address specified by the profile data.

5. The method of claim 1 further comprising:

filtering the incoming message to determine if a portion of the incoming message matches a value in the profile data; and modifying the pager message in response to the value.

6. The method of claim 4 further comprising evaluating the authorized user profile data to determine if a blackout period has been selected by the user and delaying the sending of the pager message until after the blackout period.

7. The method of claim 6 wherein the filtering step further comprises filtering the incoming message to determine if the incoming message contains a bypass phrase stored in the authorized user's profile data and transmitting the pager message regardless of the blackout period if the bypass phrase matches.

8. The method of claim 1 further comprising:

determining whether the incoming message includes an attachment;

removing the attachment from the pager message and modifying the pager message to indicate that an attachment was sent.

9. The method of claim 8 wherein the step of creating a pager message includes creating a pager message containing at least a portion of the attachment.

10. The method of claim 9 further comprising forwarding a copy of the attachment to the at least one electronic address specified by the profile data.

11. The method of claim 1 wherein the step of creating a pager message includes limiting the pager message to a predetermined length based on a value in the profile data.

12. The method of claim 11 wherein the step of creating a pager message includes limiting the pager message to a predetermined length based on the type of pager.

13. The method of claim 1 further comprising:

filtering the incoming message to determine if a selected portion of the incoming message matches a portion of the profile data; and creating and sending a pager message to the pager electronic mailing address if a comparison a selected portion of the incoming message and a corresponding portion of the profile data indicates a message should be sent.

14. The method of claim 13 wherein the step of creating and sending a pager message creates a pager message containing the original sender's address.

15. The method of claim 1 further comprising evaluating the authorized user profile data to determine if a vacation period has been selected by the user and sending an electronic mail message to the sender indicating the user is on vacation during the vacation period.

16. The method of claim 1 further comprising;

monitoring the time following the sending of a pager message, and;

resending the pager message in the event that the user does not reply timely.

17. The method of claim 16 further comprising limiting the number of times that the pager message is resent and transmitting a timeout reply message to the sender in the event user does not reply timely to the last pager message.

* * * * *